(12) United States Patent
Liotta

(10) Patent No.: US 6,793,172 B2
(45) Date of Patent: Sep. 21, 2004

(54) LIGHTWEIGHT REMOTELY CONTROLLED AIRCRAFT

(76) Inventor: Lance A. Liotta, 8601 Bradley Blvd., Bethesda, MD (US) 20817

( * ) Notice: Subject to any disclaimer, the term of this patent is extended or adjusted under 35 U.S.C. 154(b) by 0 days.

(21) Appl. No.: 10/296,137
(22) PCT Filed: May 23, 2001
(86) PCT No.: PCT/US01/16772
§ 371 (c)(1), (2), (4) Date: Jun. 30, 2003
(87) PCT Pub. No.: WO01/89650
PCT Pub. Date: Nov. 29, 2001

(65) Prior Publication Data
US 2004/0004157 A1 Jan. 8, 2004

Related U.S. Application Data
(60) Provisional application No. 60/206,734, filed on May 24, 2000.

(51) Int. Cl.$^7$ ................................................. B64C 3/00
(52) U.S. Cl. .................... 244/12.4; 244/4 R; 244/45 R; 446/34
(58) Field of Search ............................ 244/4 R, 45 R, 244/51, 34 A, 52, 66, 56, 12.4, 189, 190; 273/67 B, 317; 416/1; 446/67, 68, 34, 35, 61, 62, 63, 66

(56) References Cited

U.S. PATENT DOCUMENTS

| | | | | |
|---|---|---|---|---|
| 2,954,943 A | * | 10/1960 | De Lagabbe | 244/12.5 |
| 3,017,139 A | * | 1/1962 | Wilhelm | 244/12.6 |
| 3,049,320 A | * | 8/1962 | Fletcher | 244/12.4 |
| 3,065,929 A | * | 11/1962 | Holland, Jr. | 244/12.4 |
| 3,903,639 A | * | 9/1975 | Howell | 446/57 |

* cited by examiner

Primary Examiner—Peter M. Poon
Assistant Examiner—Timothy D. Collins
(74) Attorney, Agent, or Firm—Fay, Sharpe, Fagan, Minnich & McKee, LLP

(57) ABSTRACT

An aircraft which is designed for remote controlled slow flight, indoor or in a small outdoor yard or field. The aerial lifting body is defined by a series of lightweight planar or thin airfoil surfaces (A1, A2, A3, A4) arranged in a radially symmetrical configuration. Suspended within the cavity (O) formed by the thin airfoil surfaces (A1, A2, A3, A4) is a thrust generating propeller system (C) that is angled upwardly and that can be regulated remotely so as to change the angle of the thrust vector within the cavity (O) for steering. Lifting, stability, turning, and general control of the direction of motion in flight is accomplished without any formal wings, rudder, tail, or control surfaces.

22 Claims, 10 Drawing Sheets

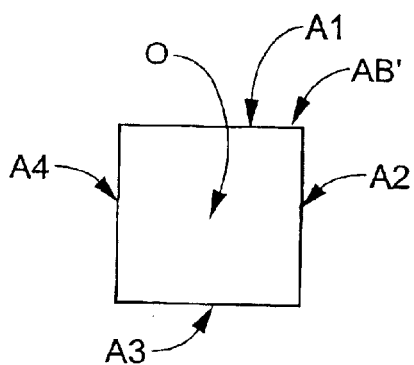
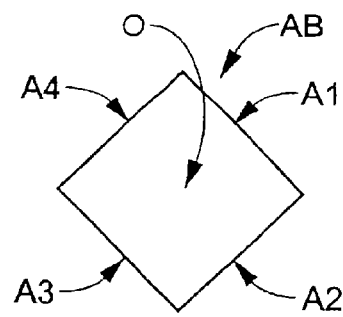
FIG. 7A  FIG. 7B
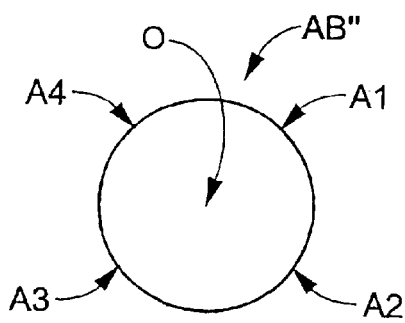
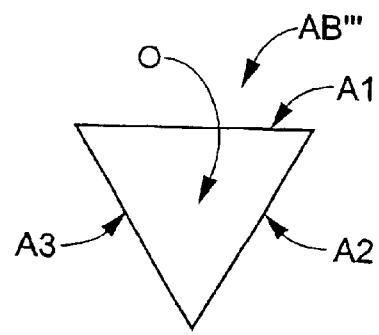
FIG. 7C  FIG. 7D
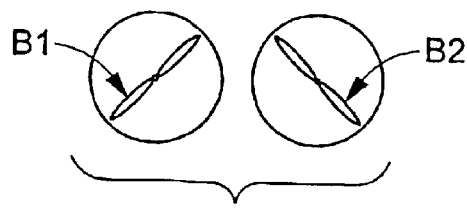
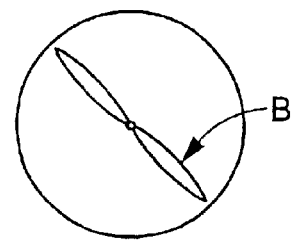
FIG. 8A  FIG. 8B

LIGHTWEIGHT REMOTELY CONTROLLED AIRCRAFT

CROSS-REFERENCE TO RELATED APPLICATION

This application claims priority from and hereby expressly incorporates by reference U.S. provisional application No. 60/206,734 filed May 24, 2000.

FIELD OF THE INVENTION

The subject invention is a toy aircraft which is designed for remote controlled slow flight, indoor or in a small outdoor yard or field. The aerial lifting body is comprised of a series of lightweight planar or thin airfoil surfaces arranged in a radially symmetrical configuration around a central cavity. A preferred embodiment is a diagonal cube. Suspended within the cavity is a thrust generating propeller system which can be regulated remotely so as to change the angle of the thrust vector within the cavity. Lifting, stability, turning, and general control of the direction of motion in flight is accomplished without any formal wings, rudder, tail, or control surfaces.

There has been a great interest recently in indoor toy aircraft which are small in size yet capable of making remote controlled flight (Radio Control Microflight March 2000 publishers Model Airplane News www.rcmicroflight.com). By necessity such aircraft must be lightweight and have a high degree of inherent stability. They also must be compact in size and design. Long extended wings and tail structures can reduce the maneuverability of the aircraft for indoor areas or small outdoor fields. Extended fragile control surfaces are also vulnerable to damage during crashes.

The first technologic objective of the invention is to provide a lightweight toy aircraft which is compact in size and shape, which is relatively crash-proof and contains an enclosed propeller system, is without extended wings or tail, yet which has a high degree of inherent flight stability, and a high degree of lift to sustain flight at low speeds. The second objective is to provide a very slow flight toy aircraft with an extremely low aspect ratio and a large dihedral so as to provide stability in yaw and lateral direction. The third objective is to provide a very slow flying toy aircraft which can be controlled in flight and can be turned in a small radius without loss of altitude, without any moving control surfaces such as rudder, ailerons, elevators or elevons. The fourth objective is to provide very light weight lift generating surfaces which are internally self-braced under tension and compression. The fifth objective is to provide a means of flight direction control using enclosed thrust vectoring control solely within the center enclosed cavity of the aircraft. Thrust vectoring is superior to moveable control surfaces at very low speed. A sixth objective is to provide a thrust vectoring means which uses only one propeller and does not require blade pitch control.

BACKGROUND OF THE INVENTION

The present radio controlled toy aircraft invention combines a compact lightweight lifting body with a single propeller vector control to achieve stable very slow flight with a high degree of radio control maneuverability in a small flight area.

Conventional control of slow flight aircraft uses large control surfaces such as elevators, rudders and ailerons or elevons. Because of the slow velocity, large area control surfaces are needed in slow flight. In addition, to achieve adequate lift at slow indoor flight velocities, large wing surfaces areas relative to total weight are required.

In the prior art of radio controlled toy aircraft, control of aircraft direction has been achieved without moveable rudder or elevators using multiple independently controlled motors and propellers (Shugo U.S. Pat. No. 5,087,000, Palieri U.S. Pat. No. 3,957,230, Kress U.S. Pat. No. 4,198,779, Yamamoto et al U.S. Pat. No. 4,760,392, Hansen et al U.S. Pat. No. 4,143,307). In such prior art the aircraft has a conventional wing and tail with horizontal and vertical tail or stabilizing wings. Two motor driven propellers at opposite sides of the central fuselage in the prior art are independently controlled to provide a relative difference in thrust velocity. A higher power applied to the propeller on one side causes the wing on that side to rotate toward the center line and to move at a higher velocity compared to the opposite retreating wing side. This results in a bank of the aircraft because the slower moving opposite wing has less lift. Without a separate control surface to attain horizontal and lateral stability, the control of turning using two independent motors and a conventional wing must therefore be done with skill to avoid a downward spiral resulting in a crash. For the prior art this limits the flight performance to gentle slow turns with a required maneuver after the turn to recovery from the bank by increasing power to gain altitude.

In the prior art tailless aircraft have required airfoils which do not have nose-down pitching moment. In a tailless aircraft such moment can not be counteracted by a horizontal tail which is at some distance behind the center of gravity (Lennon Andy, Basics of R/C Model Aircraft Design, Publisher Air Age Inc. 1996 ISBNO-911295-40-2). Highly cambered airfoils, which generate a high maximum lift, are not suitable for tailless aircraft because they have nose down pitching moment. Flat thin airfoils (Ashley H. and Landahl M. Aerodynamics of Wings and Bodies Dover Publications 1965 pgs 81–97), symmetrical airfoils (Eppler 168), or airfoils with a rear reflex (Eppler 184, Eppler 230) are required for tailless aircraft (Lennon, Andy, Basics of R/C Model Aircraft Design, Publisher Air Age Inc. 1996 ISBNO-911295-40-2). However these airfoils may have a lower maximum lift and a lower stall angle. Offsetting the stall angle can be facilitated by increasing the speed or decreasing the aspect ratio, which are both not suitable for an indoor or park-style slow flight toy aircraft. The present invention overcomes these drawbacks of the prior art.

SUMMARY OF THE INVENTION

In contrast to the prior art the aircraft of the present invention has the following unique features which combine to achieve the technologic objectives.

A lightweight slow flight lifting body is achieved with a high degree of flight stability, without tail or extended wings, using a series of opposing angled surfaces geometrically arranged around a central cavity (see FIGS. 1–4). The lift surfaces are all angled from the horizontal to achieve large dihedral stability. Opposite angles of the lifting surface panels vectorally cancel out the lift vector directions to achieve high stability.

The lift surface area is high, for the narrow span and volume occupied. The central cavity encloses the power and control pod for air thrust channeling, safety, and crash resistance.

Using only one propeller, with no blade pitch control, and no control surfaces, controlled turning of the aircraft in a small radius at low speed can be achieved without significant induced banking or rolling. The thrust direction is regulated by rotating the motor and the prop thrust angle β within the cavity of the lifting body (see FIG. 3).

The angle α of the rotation plane for the prop is at an upward pitch to the horizontal (see FIG. 2), providing an upward thrust vector and a balancing force. This maintains longitudinal stability because the center of gravity (CG) is forward of the aerodynamic center or neutral point of lift. The upward angle α thrust vector counterbalances the nose down imbalance of the CG being forward of the aerodynamic center. The angle α can be fixed or adjustable, preferably between 10 and 20 degrees. Increasing the power causes elevation of the flight path. Changing the angle β of the prop thrust vector (see FIG. 3) causes turning.

Compact Size, light weight and resiliency for a toy aircraft is achieved by using internal tension and compression bracing, and construction materials similar to that used for kites (see FIG. 5). This design also generates a flat thin or thin symmetrical airfoil necessary for a tailless aircraft. Since this is a tailless aircraft, cambered airfoils are not preferred because they exhibit nose-down pitching moment which can't be counteracted by a tail-moment arm.

An aircraft constructed in accordance with the present invention exhibits the novel and unobvious combination of aerodynamic features set forth below:

1. Very low Span (e.g., 16 in);
2. Very low Aspect Ratio (e.g., 0.44);
3. Wide chord (length) to span (width) ratio (e.g., 1.0 to 0.5);
4. Very low Reynolds number (e.g., 93,600 at sea level);
5. Very low flight speed (e.g., less than 10 mph);
6. Very high dihedral and low center of gravity for extreme lateral stability (e.g., 90 degrees compound opposing angles of lift surfaces as shown in FIGS. 1 and 4);
7. Tailless;
8. No Control Surfaces, no moveable rudder, no elevator, no aileron which are inefficient at very low flight speeds;
9. Wing body lift surfaces surround and enclose Propeller and drive system;
10. Single Propeller Thrust Control: Elevation of flight path and turning (e.g., less than 4 feet radius) controlled by rotation of thrust direction and speed (RPM) regulation of single propeller with fixed pitch.

The design of an aircraft in accordance with the present invention enables steep ascent and descent—the very low Aspect Ratio increases the effective stall angle. This solves the requirement for a symmetrical, flat or reflexed airfoil (these airfoils have no downward pitching moment) for a tailless aircraft. The present design enables narrow flat horizontal turns with a single propeller thrust angle control and no tail or control surfaces—the large dihedral coupled with 45 degree diagonal panels function as rudders achieves spiral stability. The short span of an aircraft constructed in accordance with the present invention combined with the high dihedral minimizes or prevents banking of the flight path during turning.

BRIEF DESCRIPTION OF THE DRAWINGS

The invention comprises various components and arrangements of components, preferred embodiments of which are illustrated in the accompanying drawings that form a part hereof and wherein:

FIGS. 7A–7D are front elevational diagrammatic views of alternative geometric aircraft body shapes for an aircraft formed in accordance with the present invention;

FIGS. 8A and 8B respectively illustrate first and second propeller configurations that are each usable with any of the aircraft body shapes shown in FIGS. 7A–7D with the propeller(s) arranged in either a tractor or pusher configuration;

DETAILED DESCRIPTION OF THE PREFERRED EMBODIMENTS

Figure 1:
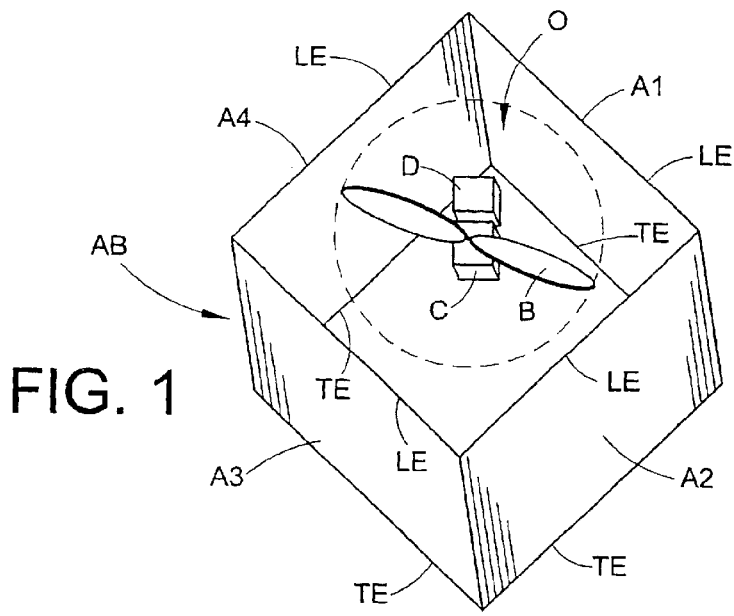
FIG. 1 is a frontal perspective view looking upward at an aircraft formed in accordance with the present invention.
Figure 2:
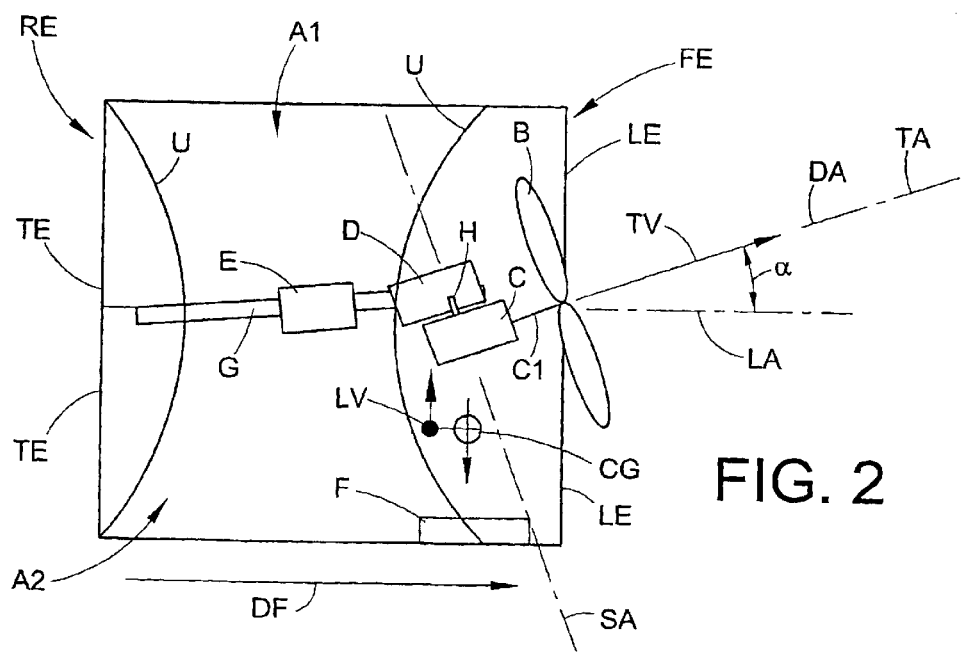
FIG. 2 is side elevational view of the aircraft shown in FIG. 1 (two airfoil surfaces of the aircraft have been removed from this view to reveal internal components)

Referring now to the drawings, in FIG. 1 it can be seen that, in the preferred embodiment, four diagonal airfoil surfaces or panels A1, A2, A3, A4 define an aircraft body AB. Each panel has a leading edge LE and a trailing edge TE spaced longitudinally from the leading edge. The panels A1–A4 define the body to have an open region O extending entirely therethrough from the respective leading edges LE to the respective trailing edges TE. As shown in FIG. 2, the leading edges LE together define a forward edge FE of the body AB while the trailing edges TE together define a rear edge of the body AB. The panels A1–A4 symmetrically enclose within the open region O a propeller B, a propeller drive system C such as an electric motor and a steering system D such as a vector control servo. It is important to note that the aircraft body AB defined by the panels A1–A4 is tailless and does not include any moveable control surfaces.

Referring now also to FIG. 2, it can be seen that the panels A1–A4 are internally braced with flexed spars U. A central spar G is connected to the flexed spars U and holds a control signal radio receiver E and the steering system D. In this embodiment, the steering system D includes an output shaft, axle or other member H that rotates about a steering axis SA and that is connected directly to the electric motor C. The center of gravity CG is low (i.e., below a plane that bisects the aircraft body horizontally) and closer to the respective leading edges LE of the panels A1–A4 than the trailing edges TE owing to the fact that the propeller and propeller drive system B,C are of the front tractor-type and a battery F is also placed at the lowermost apex of the aircraft, i.e., at the intersection of the panels A2,A3. The battery F is electrically coupled to the drive system C, the steering system D and the receiver E.

Figure 2A:
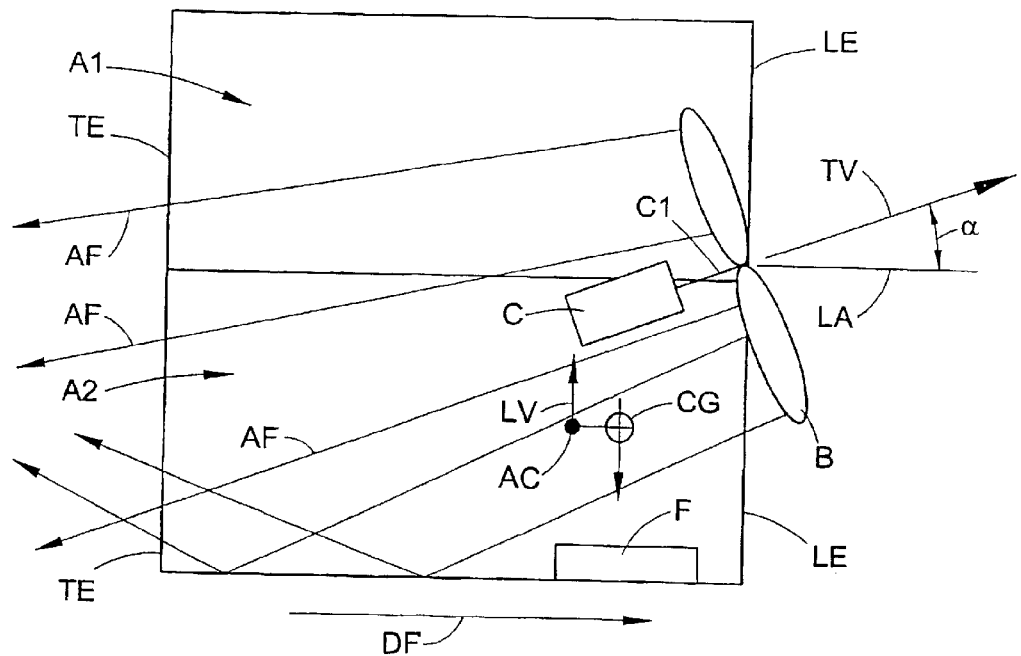
FIG. 2A is a view similar to FIG. 2 and diagrammatically illustrating aerodynamic properties of the aircraft shown in FIG. 1.

Referring now also to FIG. 2A, the propeller drive system C includes an output drive member C1 to which the propeller B is operably coupled. When the propeller drive system C is operated, the output drive member C1 thereof rotates about a drive axis DA and drives the propeller B rotatably about a thrust axis TA that, in this embodiment, is coincident with the drive axis DA. When the propeller B is driven by the drive member C1, it generates airflow as indicated by the arrows AF and resulting in thrust oriented along a thrust vector TV that is upwardly inclined at an angle $\alpha$ relative to a longitudinal axis LA of the aircraft body AB when the longitudinal axis LA lies in a horizontal plane. The angle $\alpha$ is preferably 10°–20°. In one embodiment, the drive member C1 is selectively moveable relative to the remainder of the propeller drive system C in a vertical plane to change the magnitude of the angle $\alpha$ as desired. Most preferably, a user or controller of the aircraft is uses a radio signal transmitter (not shown) to transmit a control signal to the receiver E that indicates a desired magnitude for the angle $\alpha$. The receiver controls the drive system C accordingly to set the angle $\alpha$. Thus, the angle $\alpha$ can be controlled and varied remotely during flight. The upward thrust vector TV resulting from the presence of the angle $\alpha$ provides a counterbalancing force for longitudinal stability required by the forward center of gravity CG. In FIG. 2, the aerodynamic center (neutral point of lift) of the aircraft body as defined by the panels A1–A4 is indicated at AC. The aircraft body AB, itself, generates upward lift along a lift vector indicated by the arrow LV. Finally, as noted in FIGS. 2 and 2A, the thrust oriented along the thrust vector TV also moves the aircraft forward in a direction of flight as indicated by the arrow DF. The magnitude of the thrust vector TV is controlled by the speed of the propeller B which is, in turn, controlled by the radio signal receiver E through the propeller drive system C.

Figure 2B:
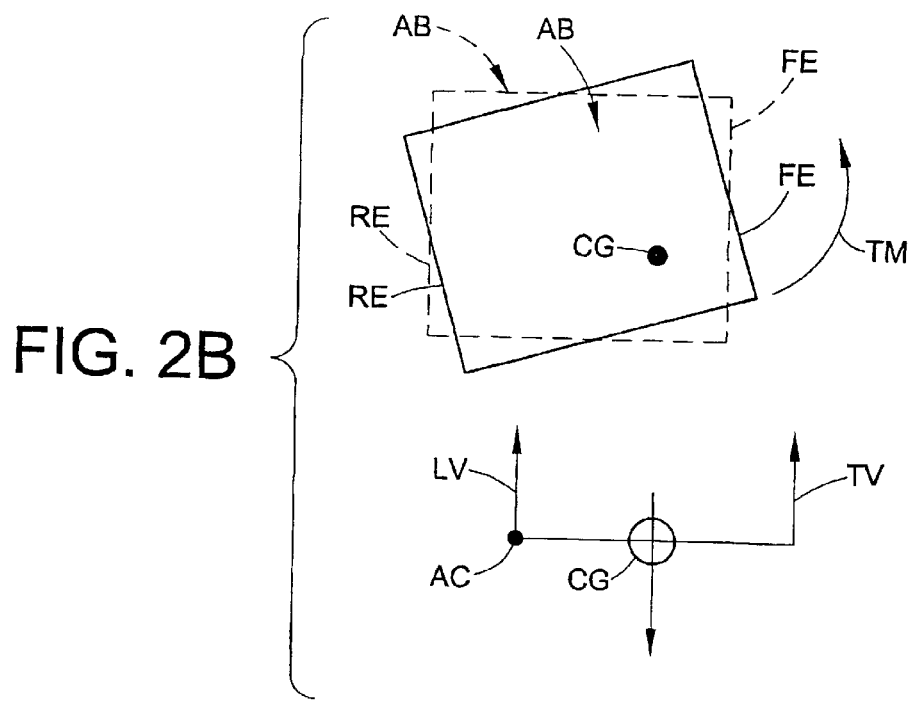
FIGS. 2B–2D are diagrams that illustrate further aerodynamic properties of the aircraft shown in FIG. 1.

As will be readily apparent to those of ordinary skill in the art, FIG. 2B diagrammatically illustrates the foregoing aerodynamic principles and shows that the lift vector LV and thrust vector TV act oppositely to the force of gravity at the center of gravity CG and an net upward moment of thrust TM acts on the aircraft body AB to lift the forward edge FE of the body relative to the rear edge RE.

Figure 2C:
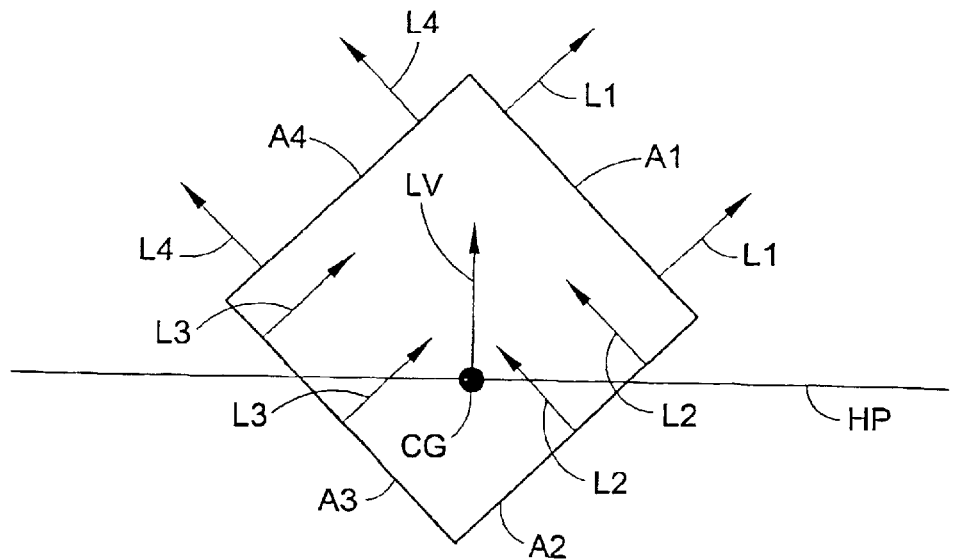

With brief reference to FIG. 2C, it can be seen that the lift vector LV is oriented upwardly and is a result of the sum of a plurality of lift vectors L1–L4 generated respectively by the airfoil panels A1–A4, i.e., the lift vectors L1–L4 are combined to define the lift vector LV.

Figure 3:
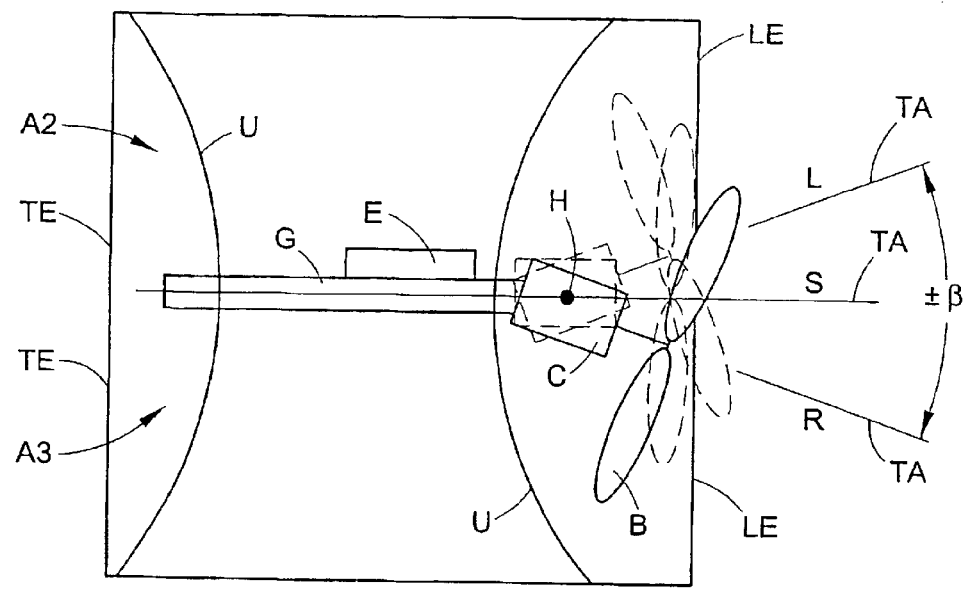
FIG. 3 is a top plan view of the aircraft shown in FIG. 1 (two airfoil surfaces have been removed from this view to reveal internal components)

FIG. 3 provides a top view wherein it can be seen that the output member H of the steering system D is operable to rotate the propeller drive motor C and, consequently, the thrust axis TA, about the steering axis SA through an angle of $\pm\beta$ from a first position L through a center position S to a second position R. Those of ordinary skill in the art will recognize that this procedure will result in steering of the aircraft, to the left when the thrust axis is moved to the first position L and to the right when the thrust axis is moved to the second position R. Of course, the aircraft moves directly ahead when the thrust axis is in the center position S. The steering system is also controlled by the radio signal receiver.

Figure 4:
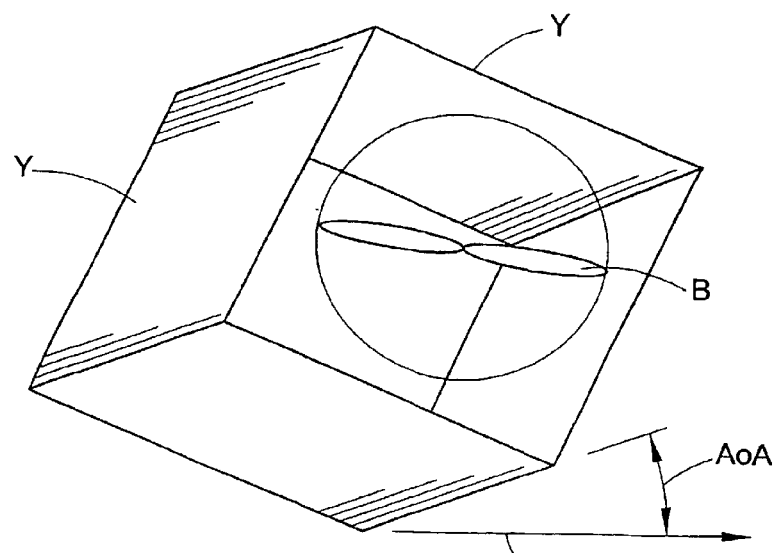
FIG. 4 is a diagrammatic illustration of the aircraft of FIG. 1 in flight.

As shown in FIG. 4, the aircraft appears as a flying diagonal cube. All four airfoil panels A1–A4 are defined as identical thin flat symmetrical airfoils. The dihedral angles Y are compound and the vectoral lift direction of the upper and lower panels is equalized and net in an upward direction LV because one panel A1,A4 is angled above the other A2,A3.

Figure 5A:
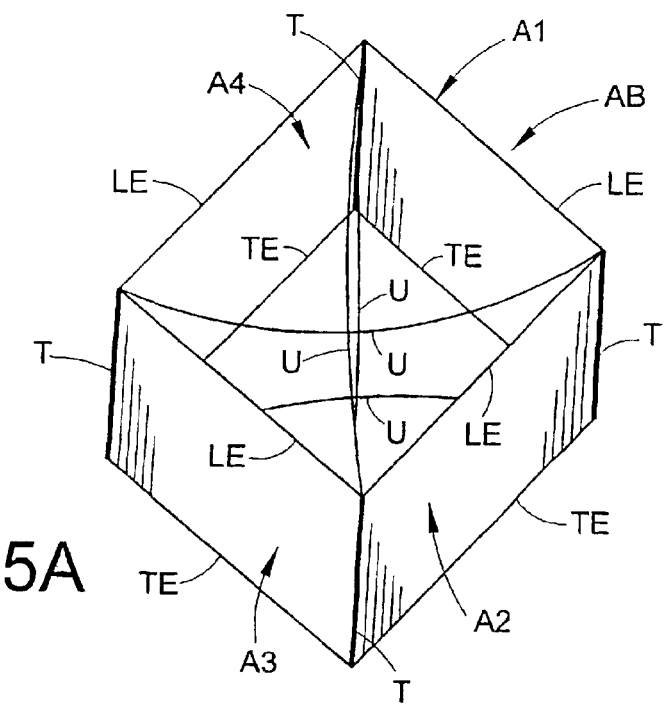
FIGS. 5A–5C are perspective, top and side views, respectively, of the body of the aircraft shown in FIG. 1 and illustrate a preferred body construction (two airfoil surfaces have been removed from FIGS. 5B and 5C to reveal various body support structures)
Figure 5B:
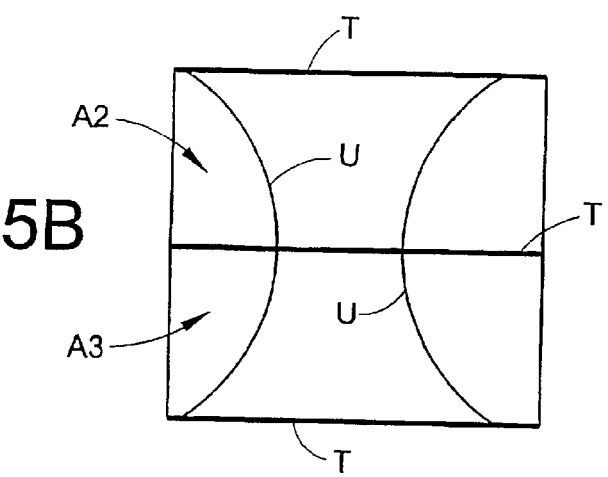
Figure 5C:
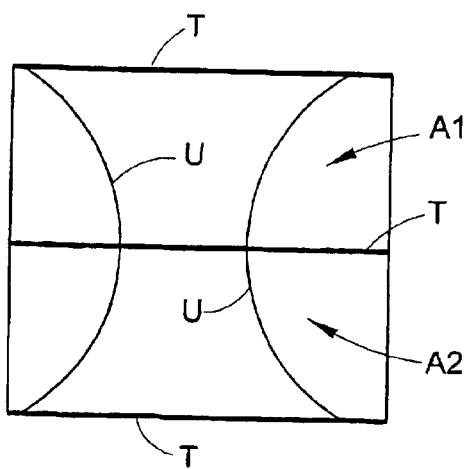

The construction of the airfoil panels A1–A4 and their interconnection to define the aircraft body AB is shown in further detail in FIG. 5. Construction of the aircraft body AB is achieved in a manner similar to a box kite using four corner spars T located at and extending longitudinally along each vertex defined by the intersection of the airfoil panels A1–A4. Four internal bracing spars U are provided and extend across the open region O defined between oppositely located vertices where the panels A1–A4 intersect adjacent both the respective leading edges and trailing edges LE,TE. The bracing spars U are resilient and urge the vertices between which they are respectively connected away from each other so that the aircraft body AB maintains its preferred general diagonal cube shape. As noted above, the central spar G (not shown in FIGS. 5A–5C) is connected to and extends between two of the bracing spars U and is used to support the steering and drive systems D,C.

The airfoil panels A1–A4 are defined as flat, thin panels and this is accomplished by supporting a lightweight covering surface under tension. In a preferred embodiment, the airfoil panels A1–A4 are each defined from a thin, lightweight material such as Rip Stop Nylon cloth or any other suitable lightweight and durable fabric, cloth or material. It is most preferred that all airfoil panels A1–A4 be defined from a single, one-piece Nylon cloth construction that is folded to define the four distinct panels A1–A4.

Figure 6A:
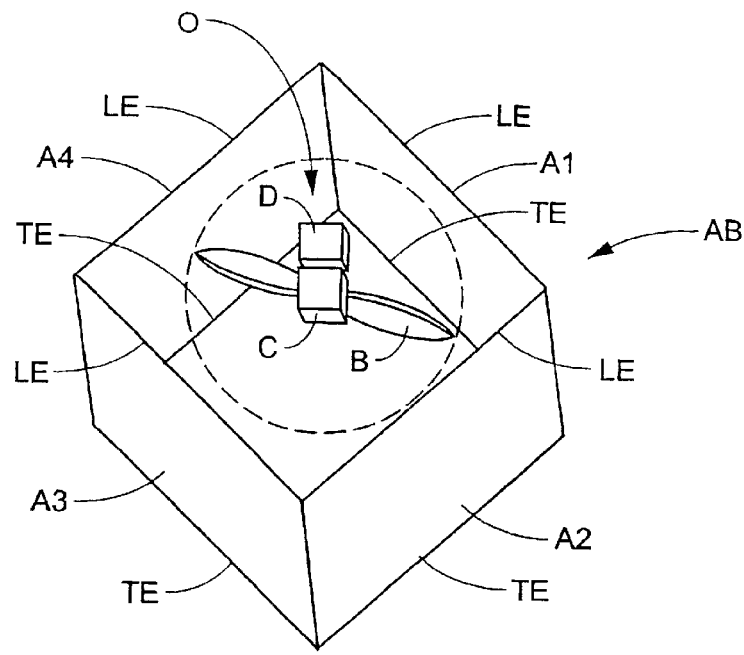
FIG. 6A is a frontal perspective view looking upward at an alternative aircraft formed in accordance with the present invention.
Figure 6B:
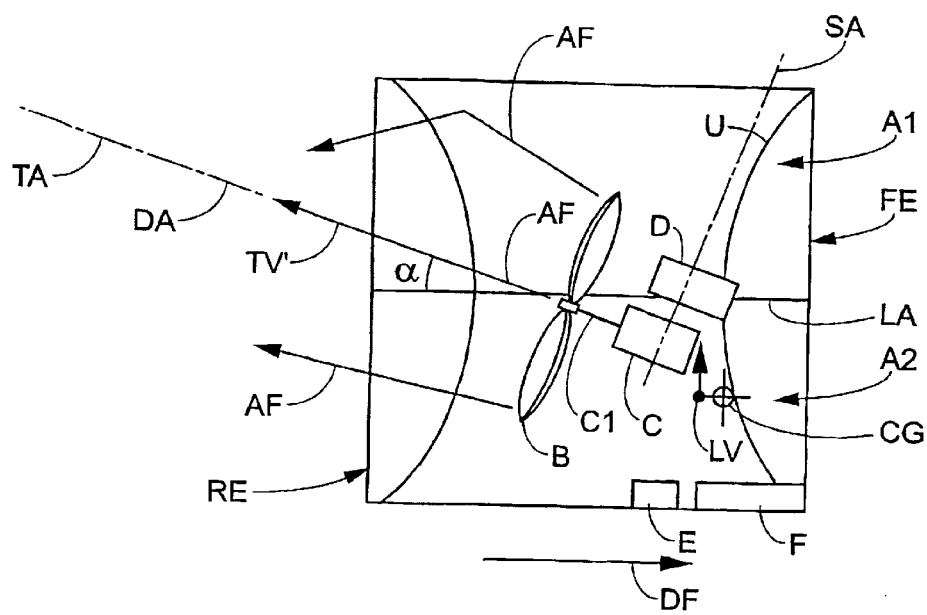
FIGS. 6B and 6C are side elevational and top plan views, respectively, of the aircraft shown in FIG. 6A (in each of FIGS. 6A, 6B, two airfoil surfaces have been removed for clarity and ease of understanding the invention)

FIGS. 6A–6D illustrate an alternative design for an aircraft formed in accordance with the present invention that is nearly identical to that illustrated in FIGS. 1–5C. Thus, like reference numerals are used to identify like components and new reference numerals are used to identify new components. A main distinction of the aircraft shown in FIGS. 6A–6D relative to that discussed above is that the propeller B is a pusher-type propeller that is located within the open region O defined by and between the airfoil panels A1–A4. As shown in FIG. 6B, the propeller drive system C drives an output member C1 about a drive axis DA and a propeller B about a thrust axis TA (the thrust axis and drive axis are preferably aligned) so that the airflow AF is directed through the open region O as shown by the arrows AF. This results in thrust being generated and directed as shown by the thrust vector TV'. The propeller B is arranged so that the thrust vector TV' is inclined a an angle $\alpha$ relative to the longitudinal axis LA of the aircraft body AB so that operation of the propeller B results in upward movement of the forward edge FE of the body relative to the rear edge RE and also forward movement of the aircraft body AB in a direction of flight as indicated by the arrow DF.

Figure 6C:
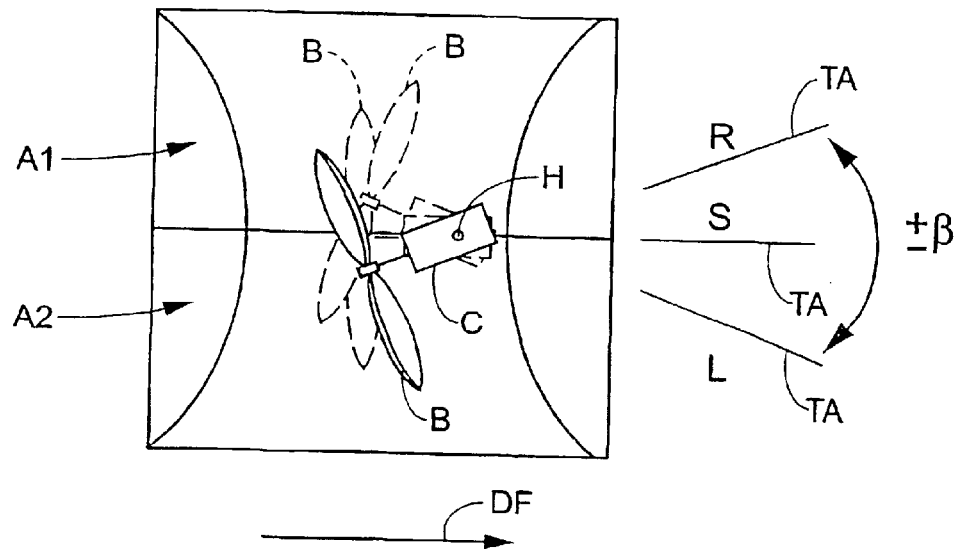
Figure 6D:
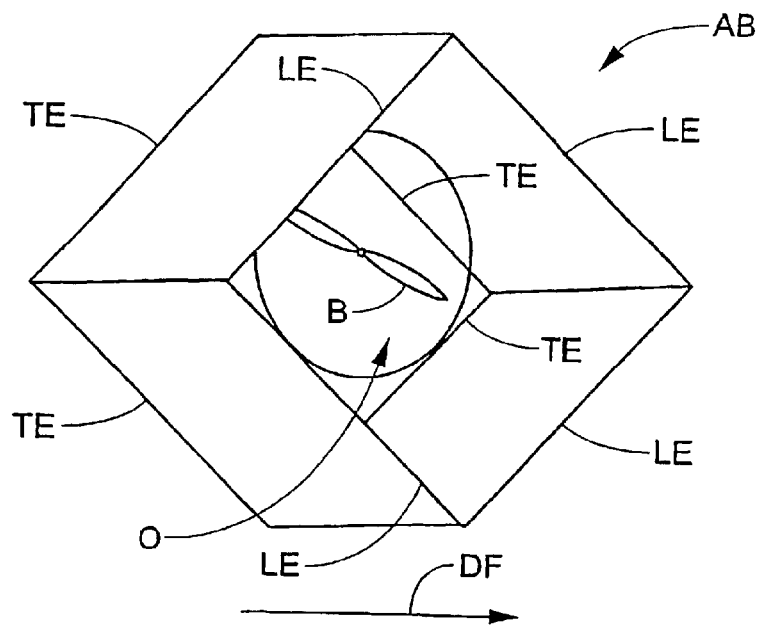
FIG. 6D diagrammatically illustrates the aircraft of FIG. 6A in flight.

FIG. 6C provides a top view with the panels A1 and A4 removed. The output member H of the steering system D is operable to rotate the propeller drive motor C and, consequently, the thrust axis TA, about the steering axis SA through an angle of $\pm\beta$ from a first position L through a center position S to a second position R. Those of ordinary skill in the art will recognize that this procedure will result in steering of the aircraft, to the left when the thrust axis is moved to the first position L and to the right when the thrust axis is moved to the second position R. Here, again, the aircraft moves directly ahead when the thrust axis is in the center position S.

FIGS. 7A–7D represent different possible shapes for the aircraft body. The aircraft body AB discussed above is shown in FIG. 7B, while FIGS. 7A, 7C and 7D respectively illustrate alternative body shapes that may be employed. Each defines the open region O and the plurality of airfoil panels A1–A4 (A1–A3 in the case of FIG. 7D) described above. Of course, numerous other shapes for the aircraft body AB are contemplated and it is not intended that the invention be limited to any particular shape.

With reference also to FIGS. 8A and 8B, it should be noted that each aircraft body 7A–7D is able to be used with either one propeller B (FIG. 8B) or with dual propellers B1,B3 (FIG. 8A). In the case of dual propellers B1,B2, those of ordinary skill in the art will recognize that one or two propeller drive systems C and one or two steering systems D can be operably coupled to the propellers B1,B2 to control the speed and steering orientation thereof.

Figure 9A:
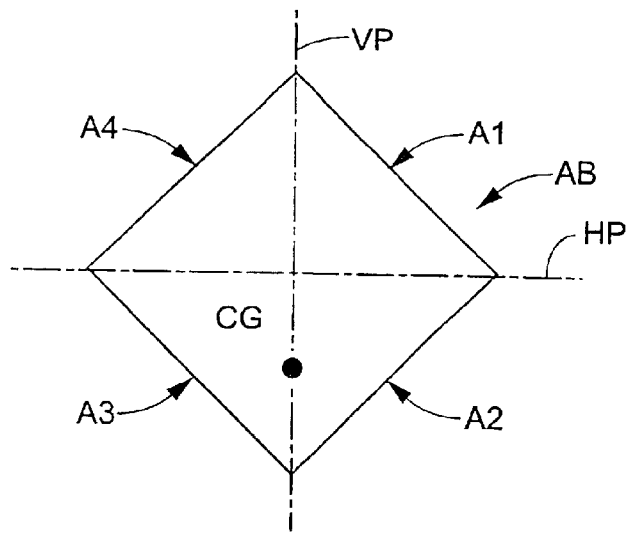
FIGS. 9A–9C diagrammatically illustrate critical design principles of an aircraft formed in accordance with the present invention; and, FIGS. 10A–10C diagrammatically illustrate alternative arrangements for the steering system of an aircraft formed in accordance with the present invention.
Figure 9B:
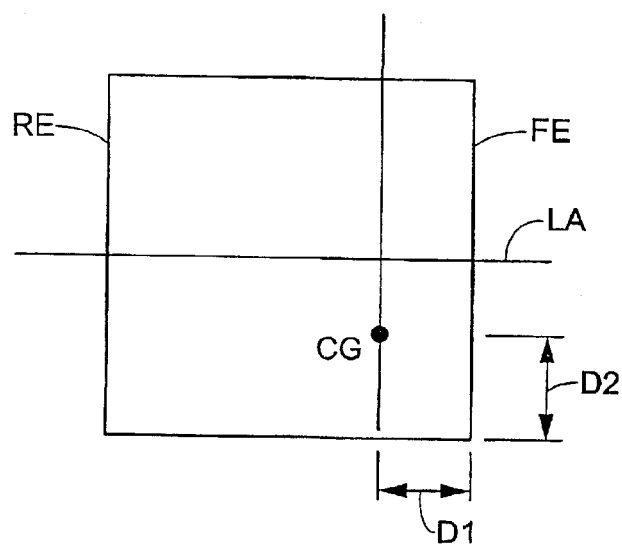
Figure 9C:
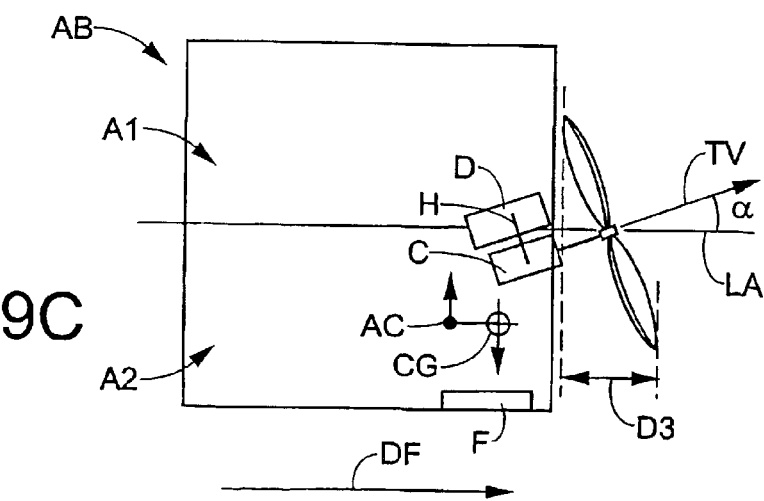

FIGS. 9A and 9B illustrate a preferred location for the center of gravity CG of an aircraft constructed in accordance with the present invention, including the body AB and all components connected thereto as described above. In particular, it is preferred that the center of gravity CG be located at a position spaced from the forward edge FE by a distance D1 that is 25%–35% of the total distance (chord) between the forward edge FE and the rear edge RE of the body AB. The preferred elevation for the center of gravity CG is a distance D2 above the lowermost vertex defined by the intersection of the airfoil panels A2,A3. The distance D2 is preferably 25%–40% of the distance between the uppermost vertex defined by the panels A1,A4 and the lowermost vertex, i.e., the height of the body AB. Finally, with reference to FIG. 9A, it is preferred that the center of gravity CG be in a vertical plane VP that extends between the uppermost and lowermost vertices and below a horizontal plane HP that extends between the lateral vertices defined respectively at the intersection of the panels A1,A2 and A3,A4. FIG. 9C shows that the propeller B can be located entirely external to the body AB and project outwardly from the open region O by a distance D3 of, e.g., 6 centimeters.

Figure 2D:
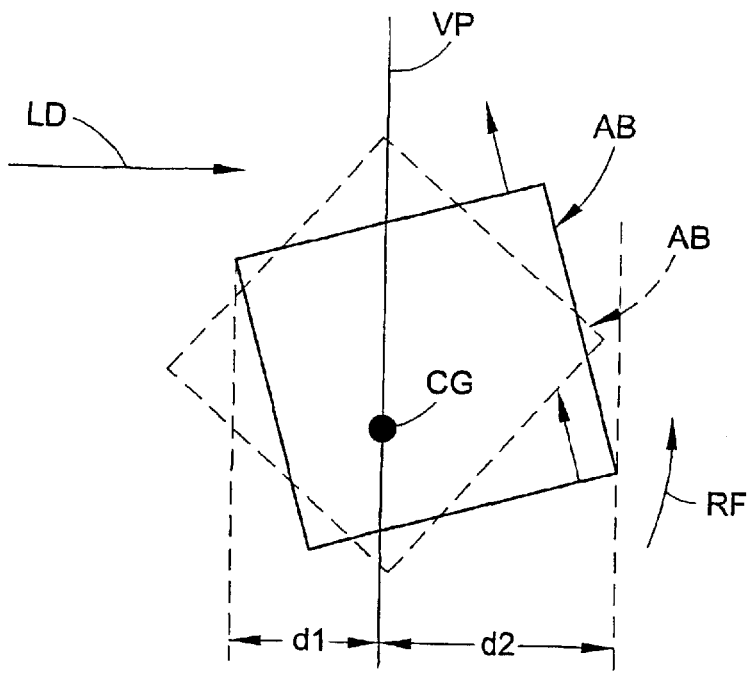

With continuing reference to FIGS. 9A–9C and also FIG. 2D, additional critical design principles of an aircraft formed in accordance with the present invention are described. As noted, the center of gravity CG is spaced 0.25-to-0.35*chord from the forward edge FE and spaced 0.25-to-0.40*height above the lowermost vertex. The center of gravity CG is closer to the respective leading edges LE than the center of lift (aerodynamic center) AC. However, the center of gravity CG must be sufficiently spaced from the respective leading edges LE so that the nose down moment caused thereby can be countered by the thrust generated along the thrust vector. The center of gravity CG is spaced vertically above the lowermost vertex but below the central longitudinal axis LA of the aircraft body AB (the axis LA lies in the horizontal plane HP). As shown in FIG. 2D, this results in an aircraft that has excellent lateral rotational stability. As a lateral disturbance LD impacts the aircraft body AB, the aircraft body rolls in the direction of the disturbance so that the body AB becomes nonsymmetric relative to a vertical plane VP. This, then, results in the distance d2 becoming greater than d1 so that additional lift is generated to counter the lateral disturbance LD and recover the aircraft body AB as indicated by the arrow RF. However, if the center of gravity CG is moved to or approaches the central longitudinal axis LA, lateral rotational stability is greatly reduced and the aircraft may not recover as described. On the other hand, if the center of gravity CG is moved too close to the lowermost vertex, "Dutch roll" oscillations following a lateral disturbance are prolonged.

As shown herein, it is also most preferred that the center of the propeller B be located at the central longitudinal axis LA of the aircraft body AB with the rotational plane facing upward. The upward thrust angle is fixed. Preferably, the steering axis SA is fixed and angled relative to vertical with the propeller drive system C connected to the steering output member H at the combined center of gravity of the motor C, propeller B and any gears or other components that operably interconnect the motor C and propeller B to prevent or at least minimize a change in the center of gravity CG of the aircraft when the thrust axis TA is rotated about the steering axis SA. Furthermore, the propeller B is preferably the largest diameter possible for a given size aircraft body. This achieves the greatest efficiency, finest control sensitivity and optimizes ducting of the expelled air.

Figure 10A:
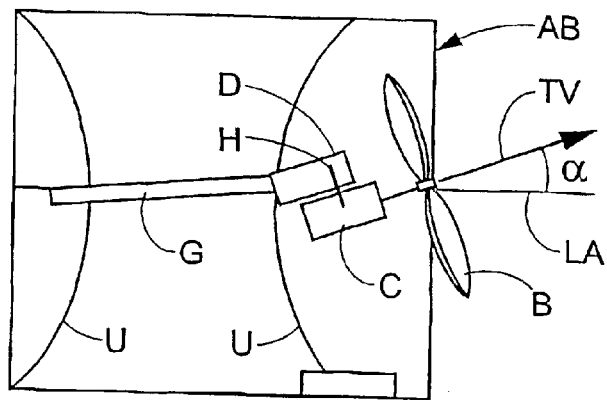
Figure 10B:
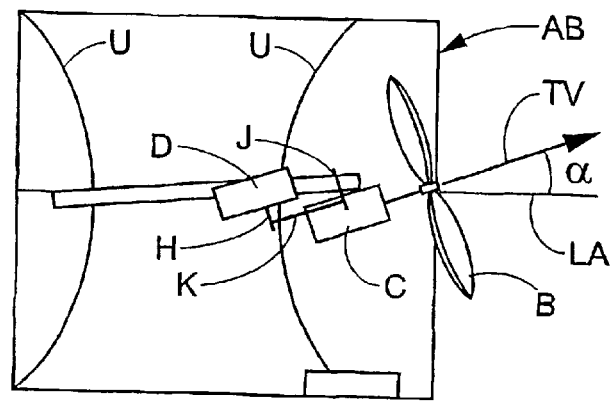
Figure 10C:
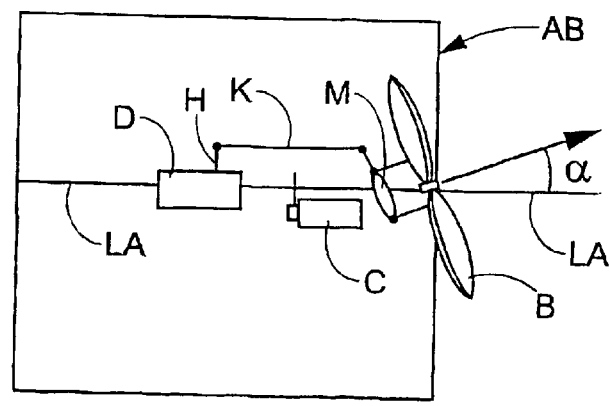

FIGS. 10A–10C illustrate alternative means of operably connecting the propeller drive system C and steering system D to the propeller B. FIG. 10A illustrates the arrangement described in detail above wherein the propeller drive motor C is directly connected to the output member H of the steering servo D. FIG. 10B illustrates a first alterative arrangement wherein the propeller drive motor C is suspended on a pivot J and operably coupled to the output member H of the steering servo D by a linkage K. FIG. 10C (a top plan view) illustrates a further alternative embodiment wherein the propeller B is operably coupled to a swash plate M that is coupled to the output member H of the servo D by a linkage K. The propeller drive motor C is fixed in position. Operation of the steering servo D causes pivoting movement of the swash plate M. In this arrangement, the propeller B can be rotated for steering and/or to change the angle α.

In operation, an associated remote radio signal transmitter (not shown) sends radio control signals to the receiver E which, in turn, controls the steering system D and propeller drive system C in accordance with the received control signals. The battery F provides electrical power to the receiver E, the steering system D and the drive system C.

The foregoing components used to construct an aircraft in accordance with the present invention are commercially available. In one preferred embodiment, the propeller drive system C comprises a MNC-DC 524 coreless motor with a 1:8.3 double ball bearing gear set and 2 mm carbon output shaft C1. The propeller B is preferably defined from carbon fiber or a like material. The battery F can be provided by a plurality of battery cells such as an 8 cell×50 mAh battery having 9 volts static thrust grams. The speed (RPM) controller of the drive system C preferably comprises a SCWES-2A Type 5 (JMP France) (Voltage 6 to 10.8) controller. The radio signal receiver E comprises, for example, a SHR-RX72-PRO FM 72 MHZ receiver. The steering control system D preferably comprises a servo such as an S-60 sub micro servo or the like. The spars T,U are preferably defined from carbon fiber; the central spar G can be defined from carbon fiber or wood. As noted above, the airfoil panels A1–A4 are preferably defined from Rip Stop Nylon cloth.

In one example of an aircraft constructed in accordance with the present invention as shown in FIG. 1, the aircraft body AB has a weight of 30 grams and the overall weight of the aircraft is 84 grams. Each airfoil panel A1–A4 is flat, thin and symmetrical and dimensioned to 12 inches×12 inches. Thus, the body AB defines a chord of 12 inches, a height of 16 inches, and a span of 16 inches. This results in wing loading of 0.75 ounces per square foot.

The invention has been described with reference to preferred embodiments. Modifications and alterations will occur to those of ordinary skill in the art upon reading and understanding this specification. It is intended that the invention be construed as including all such modifications and alterations insofar as they fall within the scope of the following claims.

Having described the preferred embodiments, what is claimed is:

1. An aircraft apparatus comprising:
    a body defining a longitudinal axis, a plurality of airfoil surfaces arranged about said longitudinal axis and an open region extending through said body and located between and defined by said airfoil surfaces, said airfoil surfaces extending along said longitudinal axis between respective leading and trailing edges;
    a propeller drive system located in said open region and comprising an output drive member rotatable about a drive axis;
    a propeller operably coupled to said output drive member and rotatable about a thrust axis in response to rotation of said output drive member;
    a steering system located in said open region and operably coupled to said propeller to pivot said thrust axis selectively and bi-directionally about a steering axis that intersects and that lies in a vertical plane with said drive axis;
    an electrical power source electrically coupled to said propeller drive system and said steering system and located in said open region;
    a control signal receiver located in said open region and operably coupled to said propeller drive system and said steering system, said control signal receiver adapted to receive control signals from an associated and remotely located signal transmitter and to alter operating parameters of said propeller drive system and said steering system in response to received control signals.

2. The aircraft apparatus as set forth in claim 1, wherein said body defines a polygonal shape that is symmetric relative to a central vertical plane that contains said longitudinal axis.

3. The aircraft apparatus as set forth in claim 1, wherein said propeller is secured to said output drive member and rotates therewith so that said drive axis and said thrust axis are coincident, and wherein said steering system is operably coupled to said output drive member and selectively pivots said output drive member and said propeller as a unit about said steering axis.

4. The aircraft apparatus as set forth in claim 2, wherein said drive axis and said steering axis lie in said central vertical plane.

5. The aircraft apparatus as set forth in claim 4, wherein said drive axis intersects said steering axis and defines an angle α therewith.

6. The aircraft apparatus as set forth in claim 5, wherein each of said airfoil surfaces are defined by thin a thin flexible sheet material, said aircraft apparatus further comprising a plurality of flexible resilient spars extending through said open region between opposed regions of said body and tensioned to maintain said opposed body regions in spaced-apart relation.

7. The aircraft apparatus as set forth in claim 1, wherein said electrical power source comprises a battery.

8. The aircraft apparatus as set forth in claim 3, wherein said steering system comprises an output shaft that rotates selectively about said steering axis, and wherein said propeller drive system is secured to said output shaft of said steering system to rotate therewith about said steering axis.

9. The aircraft apparatus as set forth in claim 2, wherein said propeller, when rotated by said propeller drive system, generates thrust that lifts said respective leading edges of said airfoil surfaces relative to said respective trailing edges of said airfoil surfaces.

10. The aircraft apparatus as set forth in claim 9 wherein said body has a center of gravity and wherein said plurality of airfoil surfaces are fixed in position and define said body to have an aerodynamic center, said center of gravity located longitudinally between said aerodynamic center and said respective leading edges of said airfoil surfaces.

11. The aircraft apparatus as set forth in claim 10, wherein said propeller is oriented to generate upward thrust along an upward thrust vector coincident with said thrust axis and that intersects said longitudinal axis at a point between said aerodynamic center and said respective leading edges of said airfoil surfaces.

12. The aircraft apparatus as set forth in claim 2, wherein said body defines one of a rhomboid and a cube comprising four airfoil surfaces and four vertices formed by intersecting airfoil surfaces, and wherein a first pair of opposed vertices lie in said central vertical plane and a second pair of opposed vertices lie in a horizontal plane.

13. The aircraft apparatus as set forth in claim 12, wherein said body has a center of gravity located below said horizontal plane and closer to said respective leading edges than said respective trailing edges of said airfoil surfaces.

14. The aircraft apparatus as set forth in claim 13, wherein said propeller is inclined relative to said longitudinal axis so that said thrust axis intersects said horizontal plane at a point closer to said respective leading edges than said respective trailing edges of said airfoil surfaces.

15. The aircraft apparatus as set forth in claim 1, wherein said aircraft defines a Reynolds number of less than 100,000 at sea level.

16. The aircraft apparatus as set forth in claim 12, wherein said aircraft defines a length (chord) to width (span) ratio of 1.0 to 0.5.

17. The aircraft apparatus as set forth in claim 1, wherein said propeller drive system comprises first and second drive motors including first and second output drive shafts rotatable about first and second parallel drive axes, respectively, and comprises first and second propellers operably coupled respectively to first and second output drive shafts and rotatable about first and second thrust axes, respectively, wherein said steering system is operably coupled to both said first and second propellers and is adapted to pivots at first and second thrust axes simultaneously about first and second steering axes that intersect and lie in a vertical plane with said first and second parallel drive axes, respectively.

18. The aircraft apparatus as set forth in claim 5, wherein the angle α is inclusively between 10° and 20° and is variable in response to input from said control signal receiver.

19. The aircraft apparatus as set forth in claim 1, wherein said plurality of airfoil surfaces of said body are defined from a single one-piece construction of cloth.

20. The aircraft apparatus as set forth in claim 19, wherein said cloth is Nylon.

21. The aircraft apparatus as set forth in claim 1, wherein said propeller is a tractor-type propeller located closer to said respective leading edges than said respective trailing edges.

22. The aircraft apparatus as set forth in claim 1, wherein said propeller is a pusher-type propeller located closer to said respective trailing edges than said respective leading edges.

* * * * *